United States Patent [19]

Francoeur et al.

[11] Patent Number: 5,784,182
[45] Date of Patent: Jul. 21, 1998

[54] DIRECTIONAL SIGHT FOR INSTRUMENTS

[75] Inventors: Louis-Gilles Francoeur, Montréal; Pierre Langlois, Ste-Catherine-J.C., both of Canada

[73] Assignee: Louis-Gilles Francoeur et al., Quebec, Canada

[21] Appl. No.: 780,419

[22] Filed: Jan. 8, 1997

Related U.S. Application Data

[63] Continuation of Ser. No. 564,031, filed as PCT/CA94/00349, Jun. 17, 1994, abandoned, which is a continuation-in-part of Ser. No. 77,626, Jun. 17, 1993, abandoned.

[51] Int. Cl.$^6$ .............................. G02B 5/32; G01C 1/06; G01B 11/00; F41G 1/467
[52] U.S. Cl. .............................. 359/1; 359/13; 359/15; 359/631; 356/142; 356/143; 356/147; 356/399; 33/265
[58] Field of Search .............................. 359/1, 13, 15, 359/428, 427, 421, 631; 356/142, 143, 147, 399, 251, 252; 33/233, 241, 248, 265

[56] References Cited

U.S. PATENT DOCUMENTS

| 4,142,297 | 3/1979 | Altier . |
| 4,669,194 | 6/1987 | Amacker . |
| 4,733,474 | 3/1988 | Cary . |
| 4,761,888 | 8/1988 | Kudlacek . |
| 4,796,364 | 1/1989 | Amacker . |

FOREIGN PATENT DOCUMENTS

| 1074646 | 4/1980 | Canada . |
| 1255556 | 6/1989 | Canada . |
| 1190361 | 1/1965 | Germany | 356/251 |
| 896676 | 5/1962 | United Kingdom | 356/251 |

Primary Examiner—Jon W. Henry
Attorney, Agent, or Firm—Michael D. Bednarek; Kilpatrick Stockton LLP

[57] ABSTRACT

The sight comprises a support adapted for mounting onto an instrument to be aimed at a target, an optical device mounted onto the support for creating an image including a first sighting mark at a first finite distance with respect to the optical device, and a device mounted on to the support for providing a second sighting mark at a finite distance with respect to the first sighting mark. The instrument is aimed at the target by aligning the sighting marks. Since at least the first sighting mark is an image, its position can be chosen to improve the accuracy of aiming by alignment of the marks without having to physically accommodate the first mark.

22 Claims, 9 Drawing Sheets

DIRECTIONAL SIGHT FOR INSTRUMENTS

This application is a continuation of U.S. patent application Ser. No. 08/564,031, now abandoned, which was filed Dec. 14, 1995, was the national phase of PCT/CA94/00349 filed Jun. 17, 1994 which was a continuation-in-part of U.S. patent application Ser. No. 08/077,626 filed Jun. 17, 1993, now abandoned.

TECHNICAL FIELD

The present invention relates to a directional sight for aligning on instrument on a target. For example, the present invention can be applied to any instrument that can shoot a projectile such as guns and bows.

BACKGROUND ART

Known in the art, there is the U.S. Pat. No. 4,012,150 granted on Mar. 15, 1977. In this patent, there is described a sight comprising a substantially transparent plate having formed thereon a hologram recording a single line of light on an otherwise substantially blank surface, the recorded light line having one end proximate the hologram and the other end relatively distant from the hologram and terminating at a point within the field of view of most of the hologram. The sight also comprises a coherent light source, and optical means for illuminating the hologram with the light source to reconstruct a virtual image of the light line so that an observer viewing a scene through the illuminated hologram may observe the superimposition of the line light with the scene.

With this invention, an observer, looking through the hologram, can adjust controls to bring the end of the light line visible in the plate into coincidence with a target in a background scene. The adjustments of the controls can also vary the position of a gun barrel so that the projectile shot by the gun will strike a target appearing in the background scene. With this invention, the sight is used for determining the distance between the gun barrel and the target, however no direct means is provided for aiming the gun at the target.

Also known in the art are U.S. Pat. Nos. 3,633,988, 3,942,901 and 4,984,370 in which the sighting is performed by bringing the reticle or point of light in coincidence with the target. Lenses, curved mirrors or holograms are used to project the image of a reticle or a light source at infinity on the axis of the sight. With such sights, no means is provided for compensating the curved trajectory of a projectile shot by the weapon. Also, with such devices, as the point of light is projected at infinity on the target, such point of light is constantly moving over the target which is inconvenient for the concentration of the user.

Also known in the art are mechanical sights that are as old as the weapons themselves. They consist basically of two mechanical sighting marks disposed along the length of the weapon. They usually consist of a V-shaped fixture near the user and a small post at the other end of the weapon. The sighting is performed by properly aligning these two sighting marks with the target.

One drawback with mechanical sights is that the precision is limited by the distance between the two sighting marks disposed on the weapon. This presents problems since projectile trajectory compensation is needed mainly with short weapons for which a mechanical sight has necessarily a low precision due to the limited length of the weapon. Revolvers and bows are two examples of what is meant by short weapon. Both of these weapons have short physical dimensions along the aiming direction.

DISCLOSURE OF THE INVENTION

The present invention provides a sighting system by which a user can aim an instrument at a target with great precision by aligning two sighting marks, at least one of which is an optically produced image provided at a finite distance, so that both sighting marks do not need to be physically accommodated by the system and instrument.

According to the present invention, there is provided a sight for aiming an instrument at a target, the sight comprising: optical means for creating an image of a first sighting mark at a first finite distance with respect to the optical means; means for providing a second sighting mark at a second finite distance with respect to the first sighting mark; and mounting means for mounting the optical means and the second sighting mark providing means to the instrument, whereby the instrument is aimed at the target by aligning the sighting marks.

DESCRIPTION OF PREFERRED EMBODIMENTS

Figure 1:
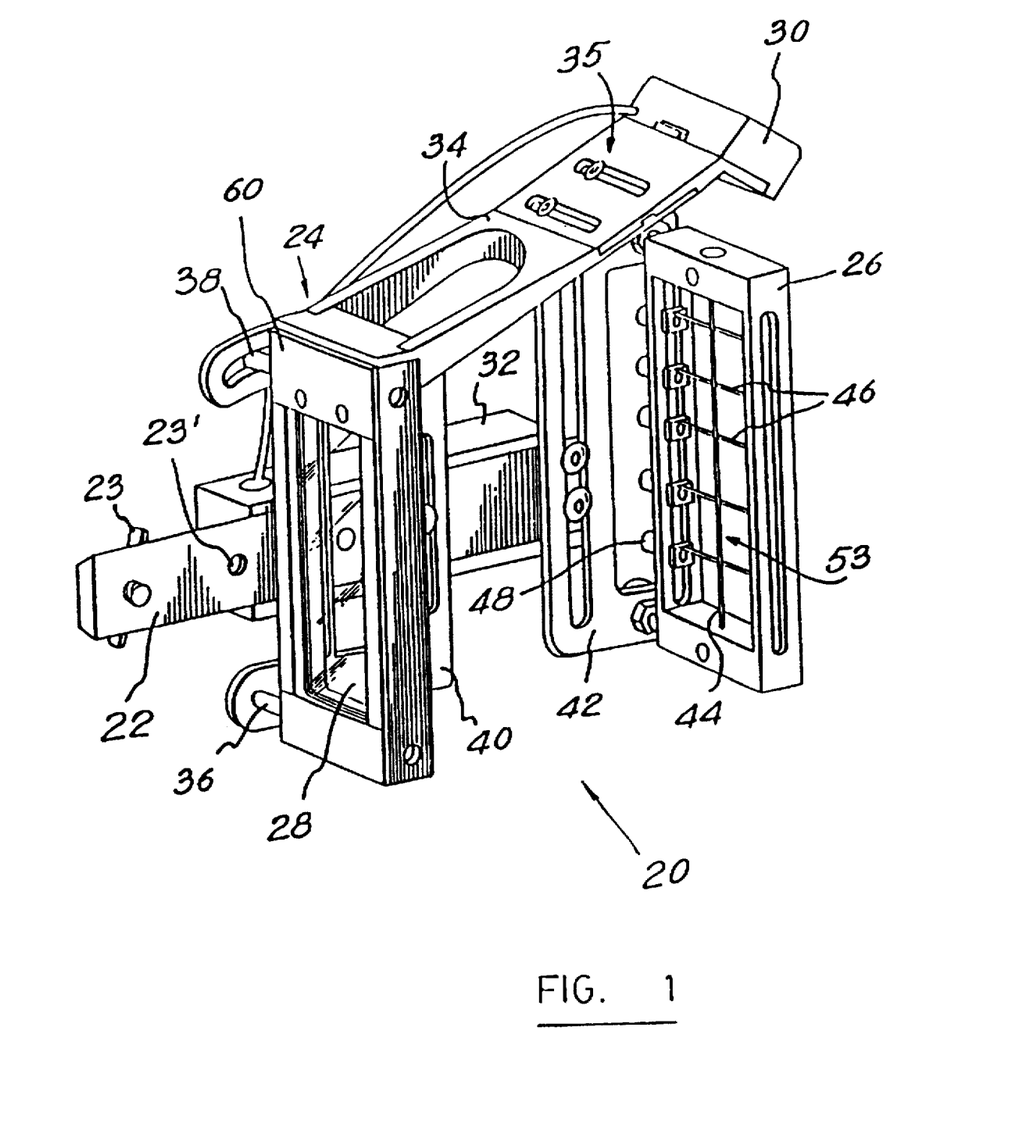
FIG. 1 is a perspective view of a first embodiment of the invention.
Figure 2:
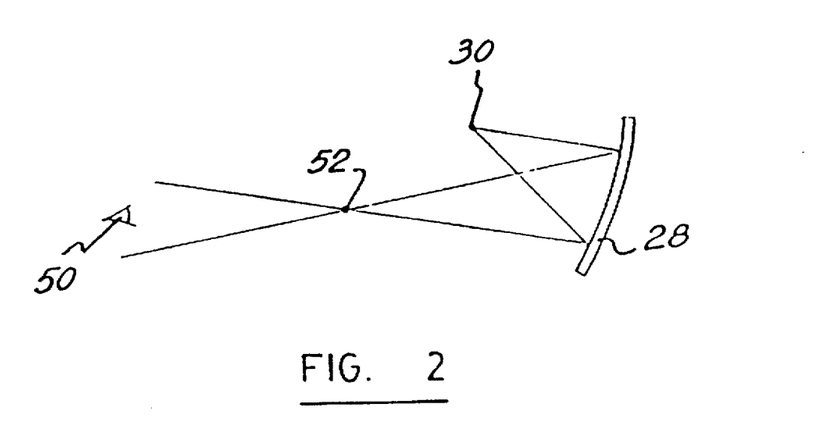
FIG. 2 is a ray diagram illustrating the production of a luminous reticle at a finite distance in space with a concave mirror.
Figure 3:
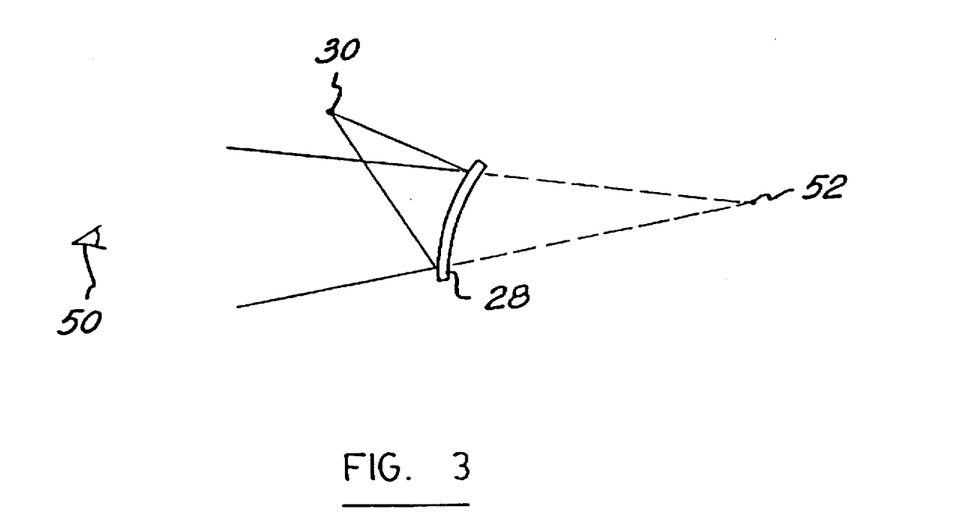
FIG. 3 is a ray diagram illustrating the production of a luminous reticle at a finite distance in space with a convex mirror; V

As shown in FIG. 1, the sight (20) according to the first embodiment has a support (22) consisting of a metal arm including a mounting screw (23) and a threaded hole (23') for mounting the support (22) to the handle of a bow. The sight has optical means (24) mounted on the support (22) by means of a mounting bracket (40). The optical means (24) comprise a frame (60) in which a transmission hologram plate (28) is mounted. A mounting arm (34) is connected at one end to the frame (60) and has at its other end a coherent light source (30) including a laser diode, a pivotal mounting (36) connecting a bottom of the frame (60) to the mounting bracket (40), and a sliding pin (38) for sliding in an arcuate groove at the top of the frame (60) and the mounting bracket (40). For clarity of illustration, the mounting nuts associated with pins (36) and (38) are not shown in FIG. 1 (see FIG. 8). The fine adjustment screw (62) and mounting unit (61), are also omitted from FIG. 1 for clarity (see FIGS. 8 and 9). A power supply (32) is provided on support (22) for is supplying power to light source (30). Means (26) provide a second sighting mark using physical crosswires (44) and (46), and means (26) are mounted to support (22) via bracket (42) (this sight is known from U.S. Pat. No. 4,136,462).

With reference to FIGS. 2 through 7, the optical means (24) will now be described in better detail.

Figures 6, 7:
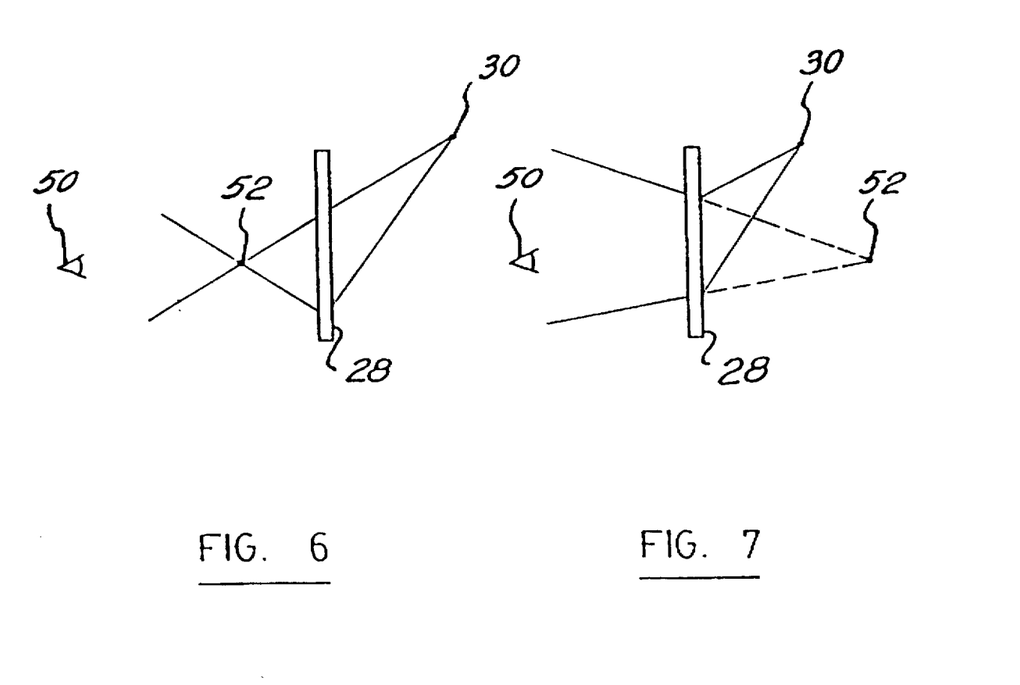
FIGS. 6 and 7 illustrate the production of a luminous reticle at a finite distance in space with transmission holograms.

In the first and the preferred embodiments, optical means (24) include a transmission hologram plate (28) which is of an optical configuration of the type illustrated in FIG. 6. The light source (30) is placed on an opposite side of the plate (28), and the real image created by the holographic plate appears at a finite distance on the viewer's side of plate (28) near the viewpoint (50). The holographic plate (28) is made by methods well known in the art by which a diffraction pattern is formed on a surface of the plate (28) by photo holographic means or other means such that the coherent light source (30) produces an image at a fixed finite distance from plate (28) when the plate is viewed from one side. From the viewer's point of vision (50) one sees image (52), and since the plate (28) is almost perfectly transparent, the viewer will also see second sight (26) formed by crosshairs (44) and (46).

In a conventional sight, two sighting marks are brought into coincidence by adjusting a pointing direction of the instrument to be aimed, and these sighting marks are physical sighting marks. This standard sight is well known in rifles where usually at the tip of the muzzle a sighting mark point is provided which has a narrow top surface, and a second sighting mark is provided at the other end of the barrel (near the viewpoint) which has a U-shaped groove, so that a visual alignment of the groove with the narrow projection provides an accurate aiming of the rifle. In a conventional telescopic rifle sight, a single reticle or sighting mark (crosshairs of extremely fine dimensions) is provided, and this reticle is superimposed on the image seen by the viewer. Alignment of the instrument is achieved since the telescope requires the viewer to be aligned with the optical axis, otherwise no image is seen. A limitation in the known telescopic system is that the field of view must be restricted for good accuracy. Therefore, it is an advantage of the present invention that the optical means (24) create a sighting mark image (52) at a distance which is fixed although substantially great with respect to the means (26) providing the second sighting mark, without restricting field of view.

In the case of a bow, the sight (20) according to the first and the preferred embodiment provides a distance between the first sighting mark (52) projected at a point not too far from the eye and before the second sighting mark (53) such that accurate aiming using sight (20) is provided.

Figure 4:
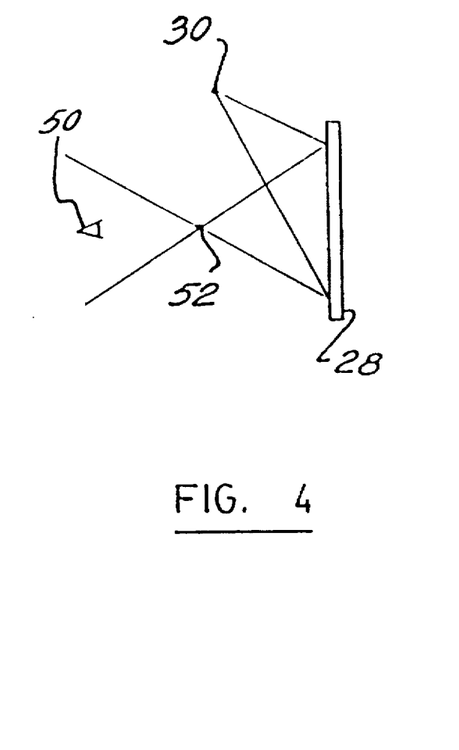
FIGS. 4 and 5 illustrate the production of a luminous reticle at a finite distance in space with reflection holograms.
Figure 5:
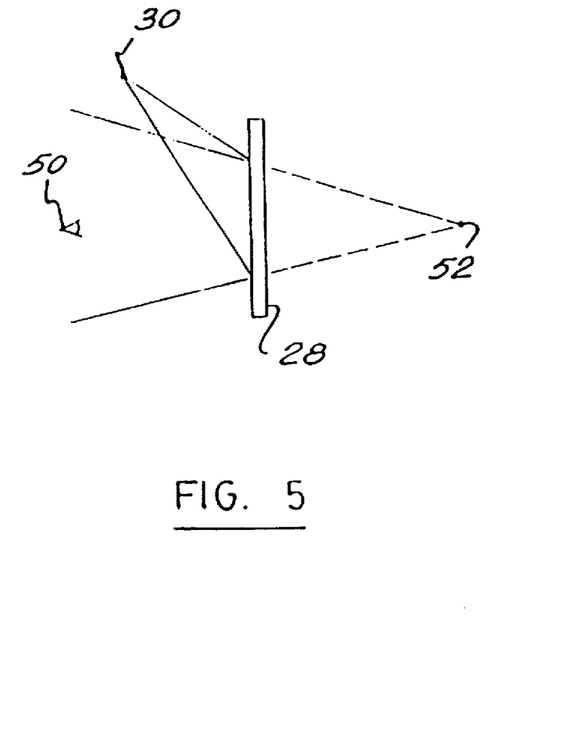

In the case of a reflection hologram as illustrated in the ray diagrams of FIGS. 4 and 5, the plates (28) are still substantially transparent such that the target and the second sighting mark are visible through plate (28). In the optical means illustrated in FIGS. 2 and 3, the convex and concave mirrors are semi-reflective or reflect only a small portion of the visible spectrum corresponding to the spectral bandwidth of the light source such that the second sighting mark and the target are visible through plate (28).

With reference now to FIGS. 1 and 8 through 13, the adjustment of the positions of first and second sighting marks (52) and (53) with respect to mounting (22) (i.e. the instrument to be aimed) will be described. It is important to keep in mind that a number of different adjustments of the sighting marks may be required. In the case of a sight for a firearm, or a bow, the position of the sight line with respect to the barrel or arrow must be properly positioned. The sight line is a line defined by the first and second sighting marks. The perpendicular distance between the sight line and the barrel or arrow is the first parameter to be taken into consideration. The azimuth and altitude of the sight line with respect to the line of fire defined by the barrel or arrow are the other two parameters to be taken into consideration. When the three parameters are properly adjusted, the sight will function properly for a given range of the ballistic weapon. When the range of the weapon is changed, the line of sight must also be changed. Adjustment screw (62) shown in FIGS. 8 and 9 moves unit (61) to adjust an angle of hologram plate (28) in order to raise or lower first sighting mark (52) for carrying out an altitude adjustment of the line of sight. In the first embodiment, the second sight (53) is vertically adjustable as a whole by loosening and tightening set screws passing through a slot in bracket (42) as shown in FIG. 1. When both marks (52) and (53) are raised or lowered, the line of sight is vertically adjusted (in offset or in altitude) with respect to the line of fire. In the preferred embodiment shown in FIG. 12, the line of sight may be adjusted with respect to the line of fire either by means (not shown) provided between the sight and its mounting bracket or by providing some angular adjustability to plate (28) in addition to the angular adjustability provided to plates (70).

Figure 12:
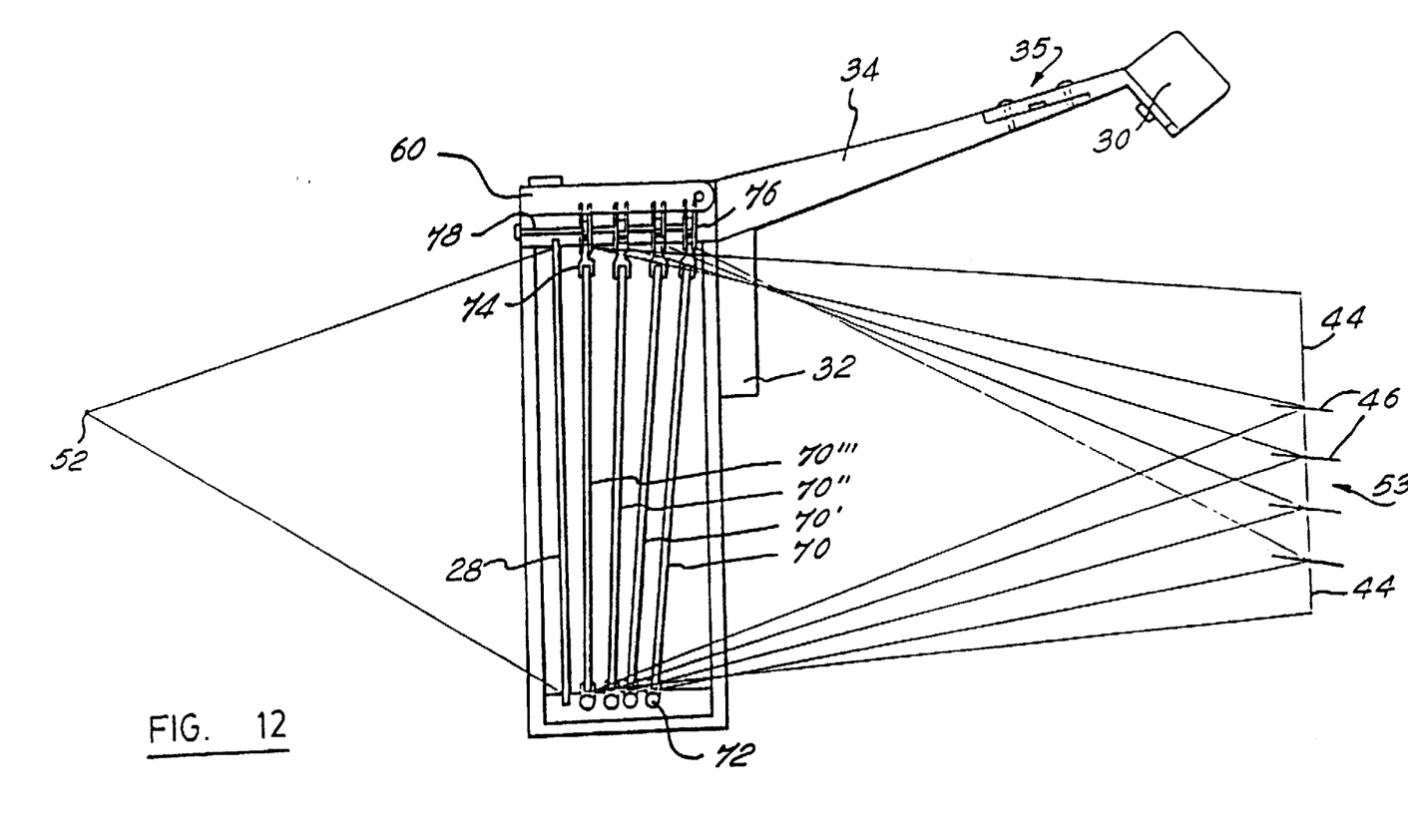
FIG. 12 is a side view of the preferred embodiment.
Figure 13:
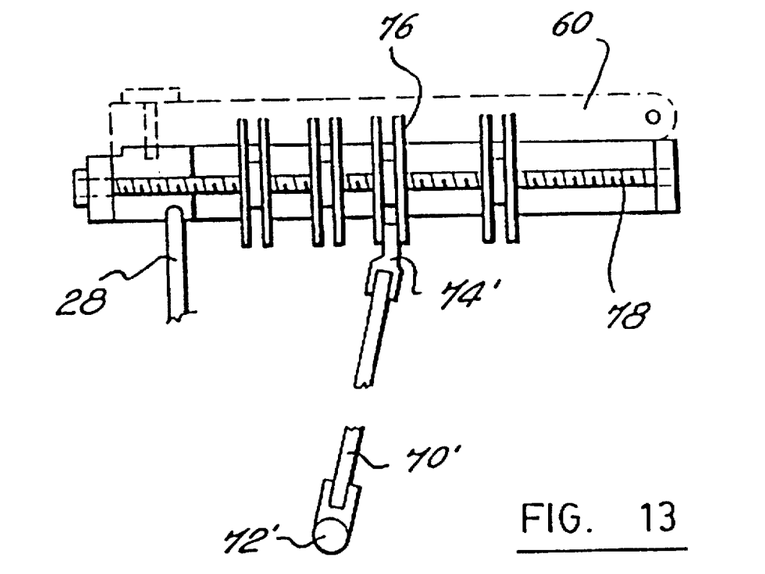
FIG. 13 is a breakaway partial side view of the preferred embodiment.
Figure 14:
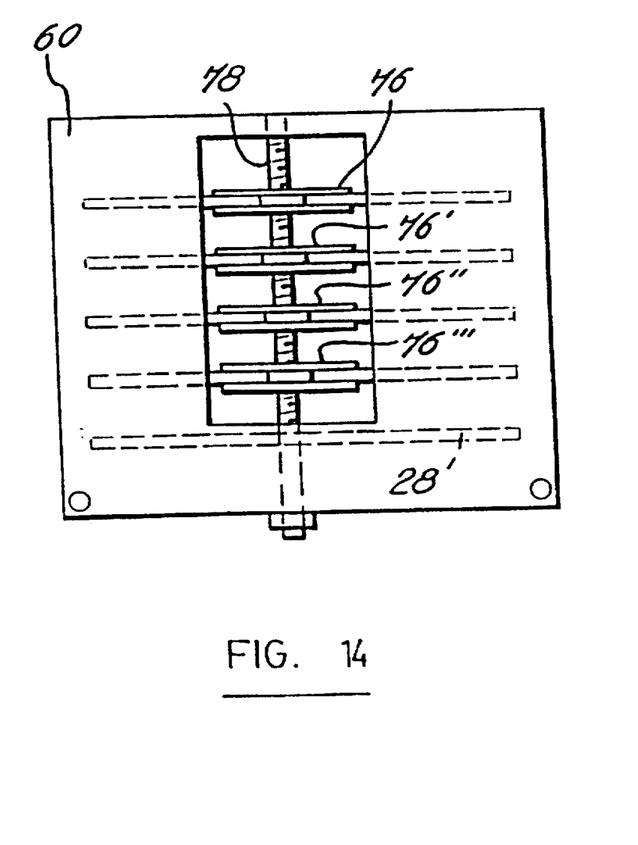
FIG. 14 is a partial top view of the preferred embodiment.

In order to adjust the azimuth of the line of sight in the first embodiment, screws are provided for adjustably connecting frame (26) to bracket (42) such that the horizontal distance between frame (26) and bracket (42) is adjustable. Similarly, frame (60) is adjustably mounted to bracket (40) in the horizontal direction, and by mutual adjustment of frames (26) and (60), the line of sight may be turned in the azimuth direction, and the line of sight may also be horizontally displaced with respect to the line of fire. In the preferred embodiment illustrated in FIGS. 11 and 12, azimuth correction of the line of sight is carried out by the adjustable mounting (35) for the light source which causes the holographic images (52) and (53) to shift in opposite directions laterally. It would also be possible to provide a pivotal amount about a vertical axis to plate (28) along with an adjustment screw in order to carry out an azimuth correction to the line of sight. Azimuth offset between sight (20) and the weapon can be carried out by the means mounting sight t20) to mounting plate (22), if required. In the first embodiment shown in FIG. 1, use of the adjustment (35) will of course only adjust the sideways position of first sighting mark (52). As best shown in FIGS. 12, 13 and 14, the hologram plates (70) (70') (70") and (70'") which each produce a horizontal bar member of crosshairs or reticle (53) are individually adjustable about a horizontal axis passing through pivot points (72) by rotating a threaded member (76) provided on a fixed threaded shaft (78). The threaded member (76) is turnable on the shaft and engages a flexible member (74) connected to an upper end of plate (70). In this way, each of the four hologram plates provides one of the four horizontal crosshair bars (46) of second sighting mark (53) which are to be calibrated for a given range under predetermined condition of bow strength and arrow type. In the preferred embodiment where the second sighting mark (53) is an image, it is also possible to provide a point or ring image instead of bars (46) which can be easily aligned with sighting mark (52), thus making vertical bar image (44) unnecessary.

As can be understood, it would be possible to provide fewer or more hologram plates (70) for providing fewer or more independently adjustable horizontal crosshair bars. It would also be possible to provide a single plate member (70), possibly including both vertical and horizontal crosshair bar members, the plate (70) being adjustable about pivot point (72) by a computer controlled motor for rotating shaft (78), threaded member (76) being connected to flexible members (74). In this arrangement, a target range finder can be used and a microcomputer could be used to calculate the exact required angular position for shaft (78) in order to set sighting mark (53) in its required position. Of course, any suitable means for controllably adjusting the optical system to move the second sighting mark (53) can be implemented. As shown in FIG. 1, the horizontal crosshairs (46) may be adjusted in height by loosening screws (48) and raising or lowering the height of one of the five illustrated horizontal crosshairs (46). In the first embodiment, the horizontal crosshairs (46) represent different sighting marks for different distances. When the first sighting mark (52) is projected towards the viewpoint (50i before the second sighting mark (53) provided by the intersection of wires (46) with wires (44), the upper wire (46) would be the second sighting mark for close range, and the lowest wire (46) would be the second sighting mark for a maximum range. It is of course presumed that the position of wires (46) is adjusted according to the draw and strength of the bow. Although a vertical crosshair (44) is used in the embodiments shown, the reticle or sighting mark (53) can be achieved by the horizontal member (46) alone provided with a visible marker such as a colored point or a notch.

Figures 8, 10:
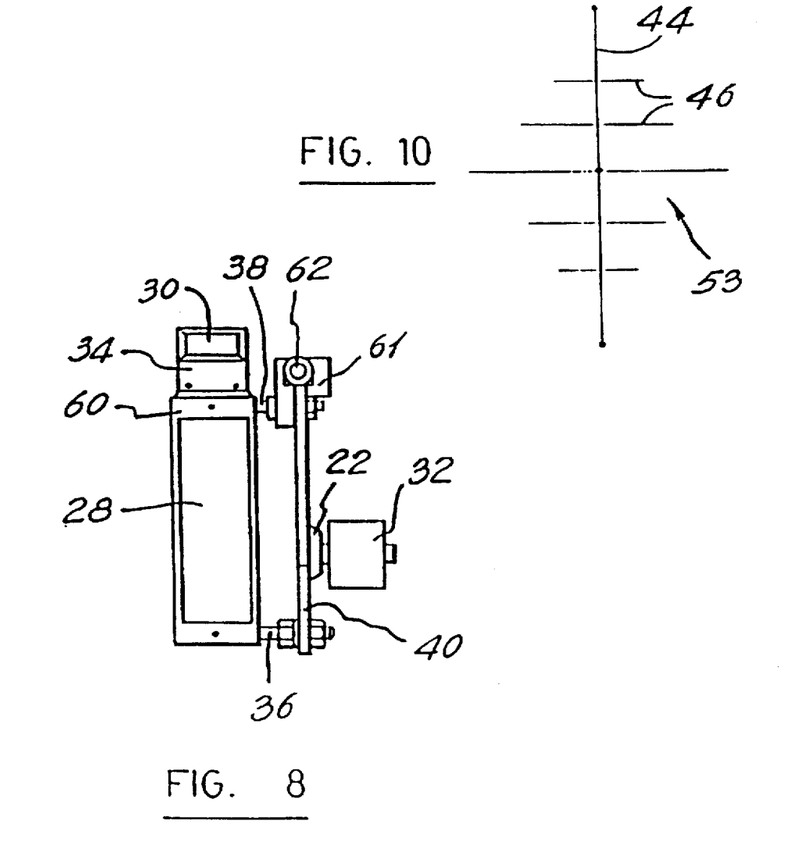
FIG. 8 illustrates a partial front view of the first embodiment showing the optical means.
FIG. 10 illustrates an image of a series of crosshairs.
Figure 9:
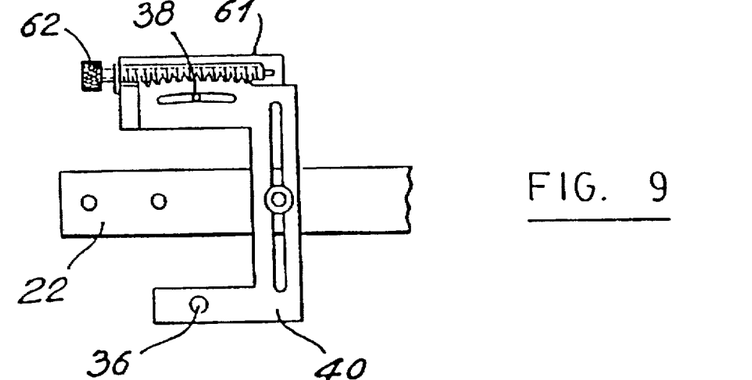
FIG. 9 is a partial side view of the first embodiment illustrating the angularly adjustable mounting for the optical means.

As shown in FIGS. 8 and 9, an altitude adjustment of the sight (20) with respect to the bow can be carried out by varying slightly an angle of the optical means (24) with respect to the bow by mounting frame (60) of optical means (24) to bracket (40) using an adjustment screw (62), such that by turning screw (62) fine adjustments of the angular relation between plate (28) and the bow can be made for adjusting the sight (20).

Lateral adjustment of the sighting mark point (52) is effected using lateral adjustment means (35) shown in FIG. 1, in which set screws fix light source (30) to member (34) while allowing a lateral shift adjustment when the set screws are loose. A lateral adjustment of source (30) by means (35) could also comprise a worm gear adjustment system. FIG. 10 illustrates a reticle image (53) according to the preferred embodiment. In the preferred embodiment of the present invention as illustrated in FIGS. 11 through 14, means (26) providing the second sighting mark are replaced by image (53) created by optical means (24).

Figures 15A, 15B:
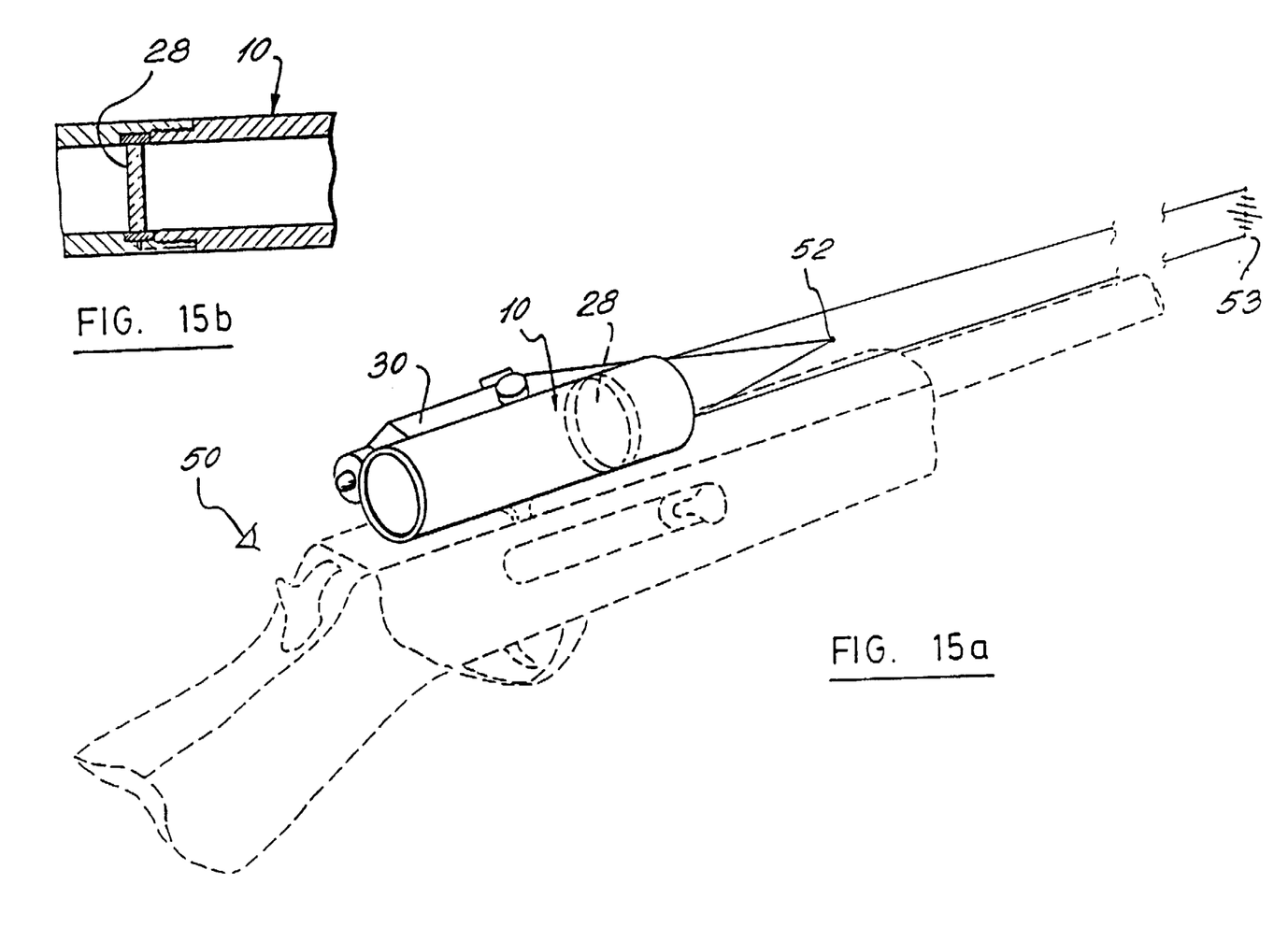
FIG. 15a is a perspective view of another embodiment of the invention mounted onto a rifle.
FIG. 15b is a detailed side cross-sectional view, of a holographic plate mounted inside the rifle sight.

In the preferred embodiment as illustrated in FIGS. 12, 13 and 14, a first holographic transmission plate (28) provides the first sighting mark (52) which is a point, as well as the vertical bar of sight mark (53). The horizontal cross bars of mark (53) are provided by four consecutive transmission holograph plates (70), (70'), (70") and (70''') which are pivotably mounted to frame (60). All of the holographic plates are illuminated by a single coherent light source (30) which may be a light emitting diode (LED) or laser diode. As shown in FIG. 13, each plate (70) is pivotally mounted to the bottom of frame (60) by a pivotal mounting (72), and the plate (70) is connected by a flexible connector (74) to a rotating threaded member (76) which can be positioned on threaded shaft (78) fixed to frame (60). By rotating disk (76), an angular position of any one of the plates with respect to plate (28) can be adjusted. Each plate (70) is set to be accurate for a given distance of the target, and the archer, when aiming, will focus on the part of the reticle image (53) which is appropriate for the distance of the target aimed for. Once the positions of the plates (70) are adjusted by rotating member (76), the sight can be considered to be calibrated and no further adjustments need to be made until there is a change in a parameter of the bow such as arrow type or draw. FIG. 15a shows the invention as applied to a rifle sight in which sighting marks (52) and (53) are projected to appear in front of holographic plate (28) (see FIG. 7). The body (10) of the sight has an end portion which is threaded to a main portion in order to sandwich holographic plate (28) in a removable fashion, ensuring interchangeability. Transparent plate (28) as shown in FIG. 15b is a disk having an enlarged rim for handling purposes w th a pin on its bottom for inserting into a groove in the main part of body (10) in order to ensure that plate (28) is inserted in perfect vertical alignment in body (10). Plate (28) includes the hologram for both images (52) and (53), and light source (30) shines light onto plate (28). The device is provided with a switch and adjustment means in order to adjust the horizontal and vertical positions of images (52) and (53) with respect to the rifle by adjusting the light source position and/or by adjusting the mounting of the sight to the rifle. When a hunter uses sight (10), a relatively large field of view may be offered by using sight (10) given that no magnification of the image seen through body (10) and plate t28) need be provided (although telescopic optics can be combined with the sight, with the advantage that telescope adjustments for full and clear vision of the target do not affect sight adjustments). The images (52) and (53) are luminous and can be clearly seen even at dawn and dusk. Since the holographic plate (28) can be made precalibrated for specific applications such as ammunition type, such applications can be easily changed without having to readjust the sight (10). By providing a relatively large distance between sighting marks (52) and (53), improved accuracy of aiming can be achieved.

Figure 11:
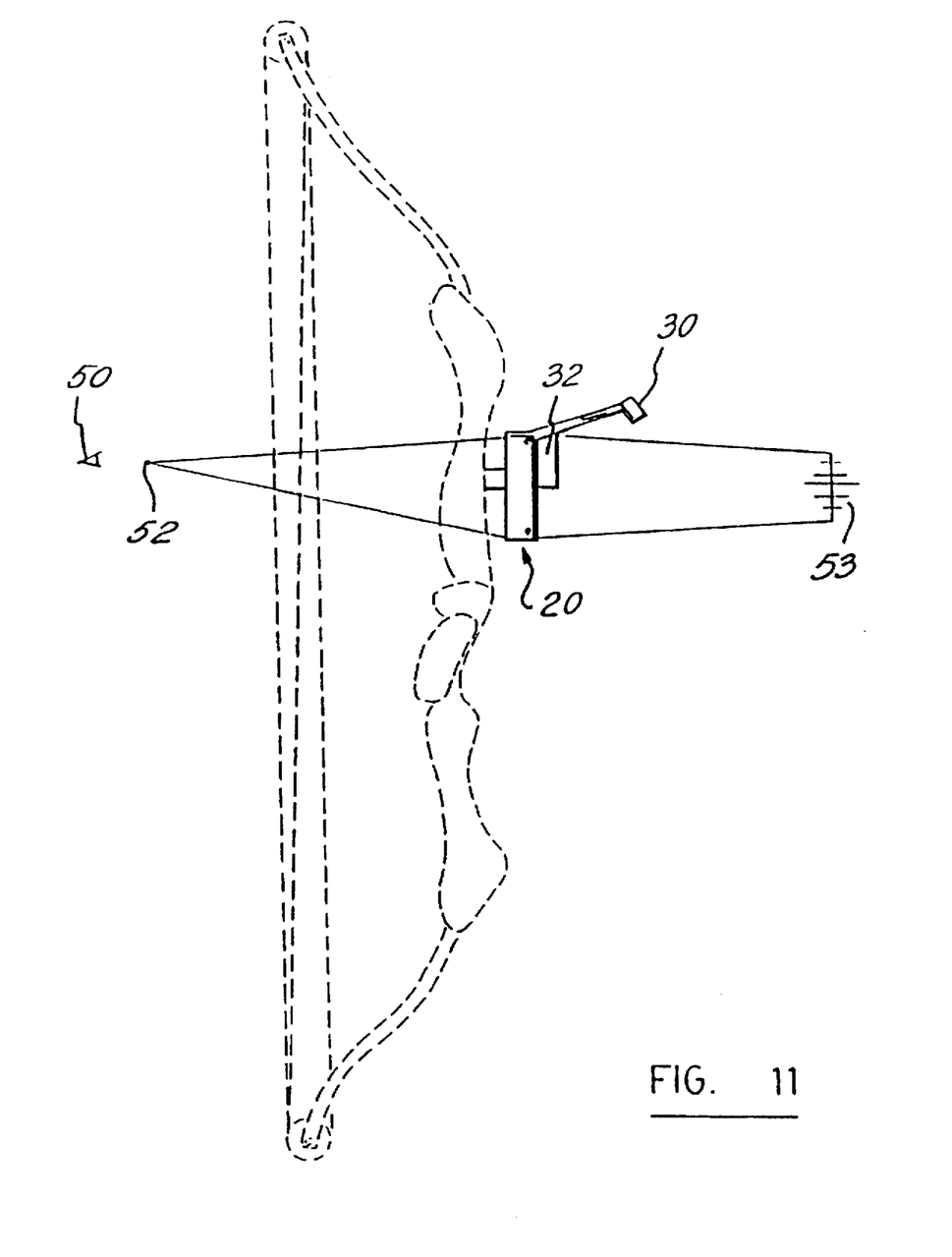
FIG. 11 illustrates the preferred embodiment of the present invention mounted to a bow.
Figures 16, 17, 18, 19:
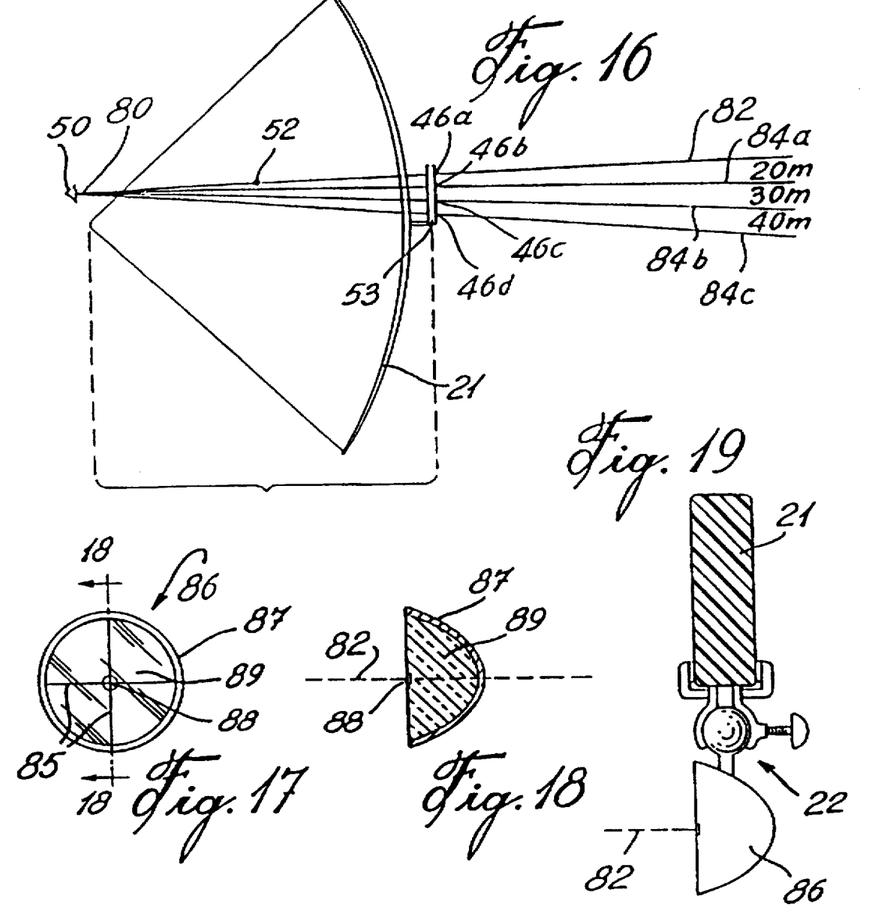
FIG. 16 is a schematic side view of an embodiment of the invention in which the view point remains fixed for a plurality of aiming altitudes.
FIGS. 17 and 18 show front and side crosssectional views of an optical device providing an image along a positioning axis.
FIG. 19 shows a top partly cross-sectional view of the device shown in FIGS. 17 and 18 mounted to an instrument.

With reference to FIG. 16, a variant method of using the sight (20) according to the embodiments of either FIGS. 1 or 11, is illustrated. In the case of an archery bow (21), the bow string is drawn a fixed distance which is usually determined by the length of the arrow. The arrow is usually held at the string end by two fingers outstretched from a flat palm whereby the hand or fingers are pressed at a fixed point near the chin or cheek such that the viewing eye (50) is at a relatively fixed position (80) with respect to the bow (21) and therefore the single sight (53). The sight (53) is adjusted for accuracy when the line of aiming is the line defined by the viewing eye (50) at position (80) and the appropriate one of reticles (46). Keeping the viewing eye (50) at point (80) from one shot to the next, as the altitude of shots vary for different distances, is a difficult task which requires great concentration and skill.

In the case of the invention illustrated in FIGS. 1 and 11 in which alignment of the viewing eye (50) is along the aiming line passing through reticle image (52) and one of the physical or image reticles (53), it is clear that the position of the viewing eye (50) would have to vary when using different ones of reticles (46). The archer would no longer be able to always hold the drawstring in its same customary position usually at or just under the chin or cheek. For some archers, this may prove uncomfortable and could even adversely affect control and performance.

However, by using one of the reticles (46), e.g. reticle (46a), in a position such that the line passing through reticle (46a) and (52) is along a positioning axis (82) intersecting the predetermined position for the viewing eye, i.e. the position of viewing eye (50) when the drawstring is held comfortably in its customary position, the archer may align reticles (52) and (46a) to confirm that his eye is in the right position (80). The positioning axis (82) may correspond with an aiming axis of bow (21) for a given range. Once the viewing eye (50) is in position (80), then alignment of the bow (21) by superposing any one of reticles (46b) through (46d) with the target will cause a sufficiently accurate alignment of bow (21) along axes (84a) through (c) respectively. As indicated, axes (84a) through (c) may be aiming axes for three different ranges of bow (21), of course, it is important that when the archer switches between aligning reticle (52) with reticle (46a) to aligning one of reticles (46b) through (d) with the target, the reorientation of the line of vision from axis (82) to axis (84) should not require such an angular shift to be either difficult or introduce inaccuracy in the position of the pupil of viewing eye (50). It is therefore preferred that axis (82) be adjacent, that is either above, below, to the right or to the left of the instrument aiming axis (84). Of course, a single vertically adjustable reticle can replace the plurality of vertically spaced reticles (46b) to (46d), as is known in the competition archery art.

In the illustration of FIG. 16, the viewing eye is (50) is brought into alignment with a single positioning axis (82) in order to be located at a predetermined position (80) within sufficient degree of accuracy. This is due to the conventional use of bow (21) which permits further positioning of the viewing eye (50) as a result of the archer's ability to set a fixed draw and to anchor his chin on the draw fingers. The viewing eye is thereby positioned with relative accuracy to pivot with respect to a fixed point at the vertex of the drawn bow string. It is to be understood that where the instrument used provides no such ability to partially fix a position of the viewing eye (50), that two intersecting positioning axes (82) are required in order to fix viewing eye (50) at a predetermined position (80).

FIGS. 17 and 18 illustrate respectively front and cross-sectional side views of an optical device for aiding in aligning viewing eye (50) along a positioning axis (82). The device (86) comprises a concave imaging (e.g. parabolic) mirror (87) filled with a transparent medium (89) having a bright image object (88) located substantially at or near the focus of the parabolic mirror (87). The bright object (88) may be a small body of fluorescent material, a light source or simply a body having a particular colour which would be seen as appearing to fill the entire face of the transparent medium (89) when viewed along axis (82). The image of object (88) will appear at a great distance and by alignment with crosshairs (85), the eye (50) can be oriented along axis (82). The crosshairs (85) take the place of reticle (46a) and the image of object (88) likewise takes the place of reticle or sighting mark image (52) of the example given in FIG. 16.

As illustrated in FIG. 19, the device (86) can be mounted to bow (21) by a suitable mounting (22) allowing angular adjustment to fix axis (82) to intersect the predetermined position (80) used by the archer. The device (86) can be mounted just above or below a conventional sight (26) as illustrated in FIG. 1 or it can be mounted directly to the frame of sight (26).

Figure 20:
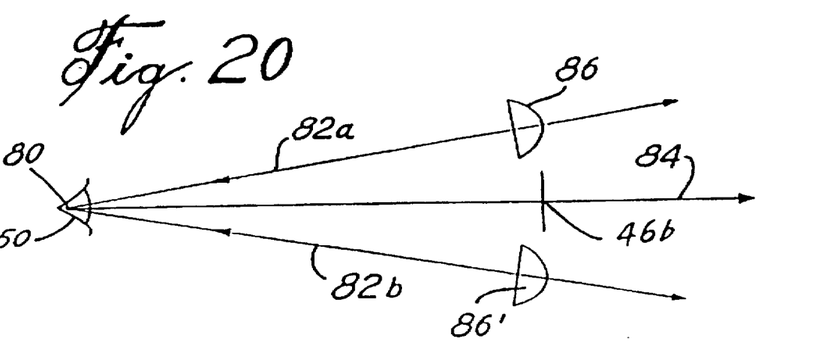
FIG. 20 is a schematic view of the sight according to an alternative embodiment of the invention in which the viewing eye is to be located at a predetermined position.

As illustrated in FIG. 20, the viewing eye (50) is placed along axis (82a) to meet position (80) by raising the viewing angle towards the image of device (86) to see the colour of object (88) along axis (82a) and to see object (88) at the center of the crosshairs (85). With an easy and small movement of the viewing angle towards reticle (46b), alignment of the eye at position (80) through reticle (46b) provides alignment along aiming axis (84). As discussed previously, if the position of the viewing eye (50) is not restricted by the way in which the instrument is held, it becomes necessary to fix viewing eye (50) at position (80) using an additional device (86) whose image is visible along axis (82b) so that when the viewing eye (50) sees the alignment of the image of object (88) with crosshairs (85) from both devices (86) and (86'), it has been determined that the viewing eye (50) is at position (80) allowing then the instrument to be aimed by aligning a single reticle (46b) with the target along axis (84).

As can be understood, alignment of the eye along axis (82) can be achieved by aligning two reticles along axis (82). The two reticles may both be optical, or a combination of optical and physical as in FIG. 16. In addition to the optical arrangement of device (86) as illustrated in FIGS. 17 and 18, other optical arrangements are possible, such as a holographic plate generating a reticle image at a very distant point. For example, reticles which are easily aligned such as a circle or dot within a ring are preferred. The ring can be the physical contour of a holder for an optical element producing the dot image.

We claim:

1. An optical bow sight for aiming a bow at a target, the sight comprising:

optical means through which the target can be sighted for creating a first sighting mark appearing in space at a first finite distance remote from the optical means and near a viewpoint, said viewpoint being at a position of an archer's eye when said bow is drawn and ready for shooting;

means for providing a second sighting mark at a second finite distance towards the target with respect to said first sighting mark, said bow being aimed at said target by adjusting a vertical and horizontal position of said bow as well as an altitude and azimuth orientation of said bow to align said viewpoint with said first and said second sighting marks and said target;

mounting means for mounting said optical means and said second sighting mark providing means to said bow near a handle thereof; and means for adjusting a position of said first and said second sighting marks relative to said bow.

2. The optical bow sight as claimed in claim 1, wherein said second sighting mark comprises one of a single vertically adjustable sighting mark, a plurality of vertically spaced fixed sighting marks, and a plurality of independently adjustable vertically spaced sighting marks to assume a plurality of vertical positions for alignment of said bow at a corresponding plurality of angles of elevation for hitting said target at more than one corresponding distance, whereby said bow can be aimed at said target by aligning said first sighting mark with said second sighting mark at one of said vertical positions for hitting said target at different distances.

3. The optical bow sight as claimed in claim 1, wherein said optical means comprises a holographic plate and a spectrally narrow and compact light source for illuminating said plate.

4. The optical bow sight as claimed in claim 2, wherein said second sighting mark comprises a physical sight located near said handle.

5. The optical bow sight as claimed in claim 2, wherein said second sighting mark comprises an image reticle mark generated by optical means.

6. The optical bow sight as claimed in claim 2, wherein said optical means comprises a holographic plate and a spectrally narrow and compact light source for illuminating said plate.

7. The optical bow sight as claimed in claim 1, wherein said second sighting mark providing means comprises a holographic plate illuminated by a spectrally narrow and compact light source for forming an image of said second sighting mark appearing in space in front of said first sighting mark toward said target, said holographic plate being adjustable in position for adjusting a vertical position of said second sighting mark.

8. The optical bow sight as claimed in claim 2, wherein said second sighting mark providing means comprises a plurality of holographic plates illuminated by a spectrally narrow and compact light source for forming respective images of said plurality of vertically spaced reticle marks appearing in front of said first sighting mark toward said target, said holographic plates being independently adjustable in position for adjusting said vertical positions of said plurality of vertically spaced reticle marks.

9. The optical bow sight as claimed in claim 1, wherein said second sighting mark is an image appearing in space nearer to said target than said bow sight, whereby a distance between said first and said second sighting marks is significantly greater than a distance between said viewpoint and said bow handle and an accuracy of said sight is enhanced.

10. The optical bow sight as claimed in claim 1, wherein said optical means create both said first sighting mark and said second sighting mark, said sighting marks appearing as images floating in space.

11. The optical bow sight as claimed in claim 10, wherein said second sighting mark comprises a plurality of vertically spaced reticle marks.

12. The optical bow sight as claimed in claim 11, wherein said optical means comprises a relatively transparent curved mirror and a light source imaged by said mirror.

13. The optical bow sight as claimed in claim 1, wherein said second sighting mark providing means comprises a semi-transparent curved mirror forming an image of a light source, said second sighting mark appearing in space in front of the first sighting mark toward said target, said curved mirror being adjustable in position for adjusting a vertical position of said second sighting mark.

14. A sight for aiming an instrument at a target, the sight comprising:

optical means through which the target can be sighted for creating a first luminous sighting mark appearing in space at a first finite distance remote from the optical means, said optical means comprising one of a relatively transparent curved mirror forming an image of a light source, and a holographic plate illuminated by a substantially monochromatic light source;

means for providing a second sighting mark at a second finite distance with respect to said first sighting mark; and mounting means for mounting said optical means and said second sighting mark providing means to said instrument, whereby said instrument can be aimed at said target by aligning a viewpoint with said first and said second sighting marks and said target.

15. The sight as claimed in claim 14, wherein said optical means comprises a relatively transparent curved mirror forming an image of a light source.

16. The sight as claimed in claim 14, wherein said optical means comprises a holographic plate and a substantially monochromatic light source illuminating said plate.

17. The sight as claimed in claim 16, wherein said first sighting mark appears in space on a viewpoint side of said optical means.

18. The sight as claimed in claim 17, wherein said holographic plate creates an image of said second mark appearing in space on a target side of said optical means.

19. The sight as claimed in claim 16, wherein said mounting means are provided on said instrument at a position near said viewpoint, said first sighting mark appears on a target side of said optical means and substantially within a physical extent of said instrument, and said holographic plate creates an image of said second mark appearing in space on a target side of said optical means substantially beyond said physical extent of said instrument.

20. The sight as claimed in claim 14, wherein said first sighting mark is a single reticle appearing on a target side, and wherein said second sighting mark appears between said first sighting mark and said viewpoint and comprises one of a single vertically adjustable sighting mark, a plurality of vertically spaced fixed sighting marks, and a plurality of independently adjustable vertically spaced sighting marks to assume a plurality of vertical positions for alignment of said instrument at a corresponding plurality of angles of elevation for hitting said target at more than one corresponding distance, whereby said instrument can be aimed at said target by aligning said first sighting mark with said second sighting mark at one of said vertical positions for hitting said target at different distances.

21. A holographic optical element for use in an optical weapon sight, said holographic optical element comprising a substantially transparent holographic medium plate and at least one stored holographic modulation pattern on said plate which generates when illuminated by a substantially monochromatic light source an image of a first sighting mark and an image of a second sighting mark including a plurality of vertically disposed reticles for aiming at a number of predetermined target distances, a first finite distance between a vertical plane of said first sighting mark image and a vertical plane of said second sighting mark image, and second finite distances between each of said plurality of vertically disposed reticles being precalibrated for a given kind of ammunition, whereby when said plate is illuminated by a substantially monochromatic light source, images of said first and second sighting marks are seen through said plate, said images being precalibrated for aiming said weapon at said number of predetermined target distances using said given kind of ammunition, said holographic plate being interchangeable.

22. An optical bow head alignment sight for positioning an archer's eye in a substantially fixed position with respect to a bow when said bow is drawn and prior to aiming a bow at a target using a conventional single sighting mark bow sight, the alignment sight comprising:

optical means for creating a first alignment mark appearing in space at a first finite distance remote from the optical means;

means for providing a second alignment mark at a second finite distance with respect to said first alignment mark, said archer's eye being placed substantially in said fixed position prior to aiming said bow at a target by adjusting a position of said archer's head with respect to said drawn bow to align said first and said second alignment marks;

mounting means for mounting said optical means and said second sighting mark providing means to said bow; and means for adjusting a position of said first and said second alignment marks relative to said bow.

* * * * *